United States Patent
Bintz

(10) Patent No.: US 10,954,861 B2
(45) Date of Patent: Mar. 23, 2021

(54) SEAL FOR A GAS TURBINE ENGINE

(71) Applicant: United Technologies Corporation, Farmington, CT (US)

(72) Inventor: Matthew E. Bintz, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 10 days.

(21) Appl. No.: 16/353,165

(22) Filed: Mar. 14, 2019

(65) Prior Publication Data

US 2020/0291861 A1    Sep. 17, 2020

(51) Int. Cl.
  *F02C 7/28*  (2006.01)
  *F01D 11/00* (2006.01)
  *F01D 5/06*  (2006.01)

(52) U.S. Cl.
  CPC .................. *F02C 7/28* (2013.01); *F01D 5/06* (2013.01); *F01D 11/005* (2013.01); *F05D 2260/20* (2013.01)

(58) Field of Classification Search
  CPC .......... F01D 5/066; F01D 5/085; F01D 5/088; F01D 5/082
  See application file for complete search history.

(56) References Cited

U.S. PATENT DOCUMENTS

| | | | |
|---|---|---|---|
| 2,973,938 A | 3/1961 | Alford | |
| 4,750,746 A | 6/1988 | Boudot | |
| 4,793,772 A | 12/1988 | Zaehring | |
| 7,870,742 B2 | 1/2011 | Lee et al. | |
| 8,152,471 B2 * | 4/2012 | Pichel | F01D 5/066 416/198 A |
| 8,312,702 B2 * | 11/2012 | Bart | F01D 25/18 60/39.08 |
| 9,556,737 B2 * | 1/2017 | Janarthanan | F01D 5/066 |
| 9,777,576 B2 | 10/2017 | Maguire | |
| 2012/0051917 A1 | 3/2012 | Wines | |
| 2013/0209238 A1 | 8/2013 | Belmonte | |
| 2013/0236310 A1 | 9/2013 | Billings | |
| 2016/0215792 A1 | 7/2016 | Hiester | |
| 2017/0023023 A1 | 1/2017 | Hiernaux | |

OTHER PUBLICATIONS

Extended EP Search Report for EP Application No. 21 63036.5 dated Sep. 10, 2020.

* cited by examiner

*Primary Examiner* — Justin D Seabe
(74) *Attorney, Agent, or Firm* — Carlson, Gaskey & Olds, P.C.

(57) ABSTRACT

A seal for a rotor stack includes a first portion that includes a shaft contact surface. A second portion includes a rotor disk contact surface. A transition portion connects the first portion and the second portion. The transition portion extends radially outward from the first portion.

14 Claims, 3 Drawing Sheets

SEAL FOR A GAS TURBINE ENGINE

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

As the air travels through the compressor section, a temperature of the air in the core flow path C increases in response to the work performed to elevate the pressure of that air. The increasing temperature of the air in the core flow path C warms the surrounding components in the compressor section causing those components to expand. This expansion can cause thermal mechanical fatigue in the components. Therefore, there is a need to improve thermal management in the compressor section to reduce thermal mechanical fatigue.

SUMMARY

In one exemplary embodiment, a seal for a rotor stack includes a first portion that includes a shaft contact surface. A second portion includes a rotor disk contact surface. A transition portion connects the first portion and the second portion. The transition portion extends radially outward from the first portion.

In a further embodiment of the above, the shaft contact surface faces radially inward. An end of the first portion includes a tab contact surface.

In a further embodiment of any of the above, the shaft contact surface faces radially inward. The first portion includes a first thickness at the shaft contact surface and a second thickness axially spaced from the shaft contact surface. The first thickness is greater than the second thickness.

In a further embodiment of any of the above, the transition portion extends radially outward and axially from the first portion.

In a further embodiment of any of the above, a thickness of the transition portion is less than a thickness of the first portion.

In a further embodiment of any of the above, at least a portion of the transition portion is conical.

In a further embodiment of any of the above, the rotor disk contact surface faces radially inward.

In another exemplary embodiment, a gas turbine engine includes a plurality of rotor disks and a second plurality of rotor disks aft of the first plurality of rotor disks. The first plurality of rotor disks includes an aft rotor disk. A shaft is located radially inward from the first plurality of rotor disks and the second plurality of rotor disks. A seal extends from the shaft to the aft rotor disk. The seal contacts the shaft axially spaced from the aft rotor disk.

In a further embodiment of any of the above, the seal includes a first portion that has a shaft contact surface. A second portion has a rotor disk contact surface. A transition portion connects the first portion and the second portion. The transition portion extends radially outward from the first portion.

In a further embodiment of any of the above, the shaft contact surface faces radially inward. An end of the shaft contact portion includes a tab contact surface for engaging a tab on the shaft.

In a further embodiment of any of the above, the shaft contact surface faces radially inward. The first portion includes a first thickness at the shaft contact surface and a second thickness spaced of the shaft contact surface. The first thickness is greater than the second thickness.

In a further embodiment of any of the above, the transition portion extends radially outward and axially from the first portion.

In a further embodiment of any of the above, a thickness of the transition portion is less than a thickness of the first portion.

In a further embodiment of any of the above, at least a portion of the transition portion is conical. At least a portion of the first portion is cylindrical.

In a further embodiment of any of the above, the second portion includes a rotor disk contact surface that faces radially inward and engages a radially outer surface of a tab on an axially forward side of the aft rotor disk.

In a further embodiment of any of the above, the second portion engages an axially forward side of the aft rotor disk.

In another exemplary embodiment, a method of sealing a shaft relative to a rotor disk includes the step of locating a first plurality of rotor disks axially forward of a second plurality of rotor disks. A shaft is located radially inward form the first plurality of rotor disks and the second plurality of rotor disks. The shaft axially spaced of an aft rotor disks of the first plurality of rotor disks is engaged with a first portion of a seal. An axial face of the aft rotor is engaged with a second portion of the seal.

In a further embodiment of any of the above, the seal includes a first portion that has a shaft contact surface. A second portion has a rotor disk contact surface. A transition portion connects the first portion and the second portion. The transition portion extends radially outward from the first portion.

In a further embodiment of any of the above, a first end of the first portion is fixed relative to the shaft and moves a second end of the first portion relative to the shaft in response to relative movement between the shaft and the aft rotor disk.

In a further embodiment of any of the above, the transition portion is moved in at least one of an axial or radial direction in response to relative movement between the shaft and the aft rotor disk.

DETAILED DESCRIPTION

Figure 1:
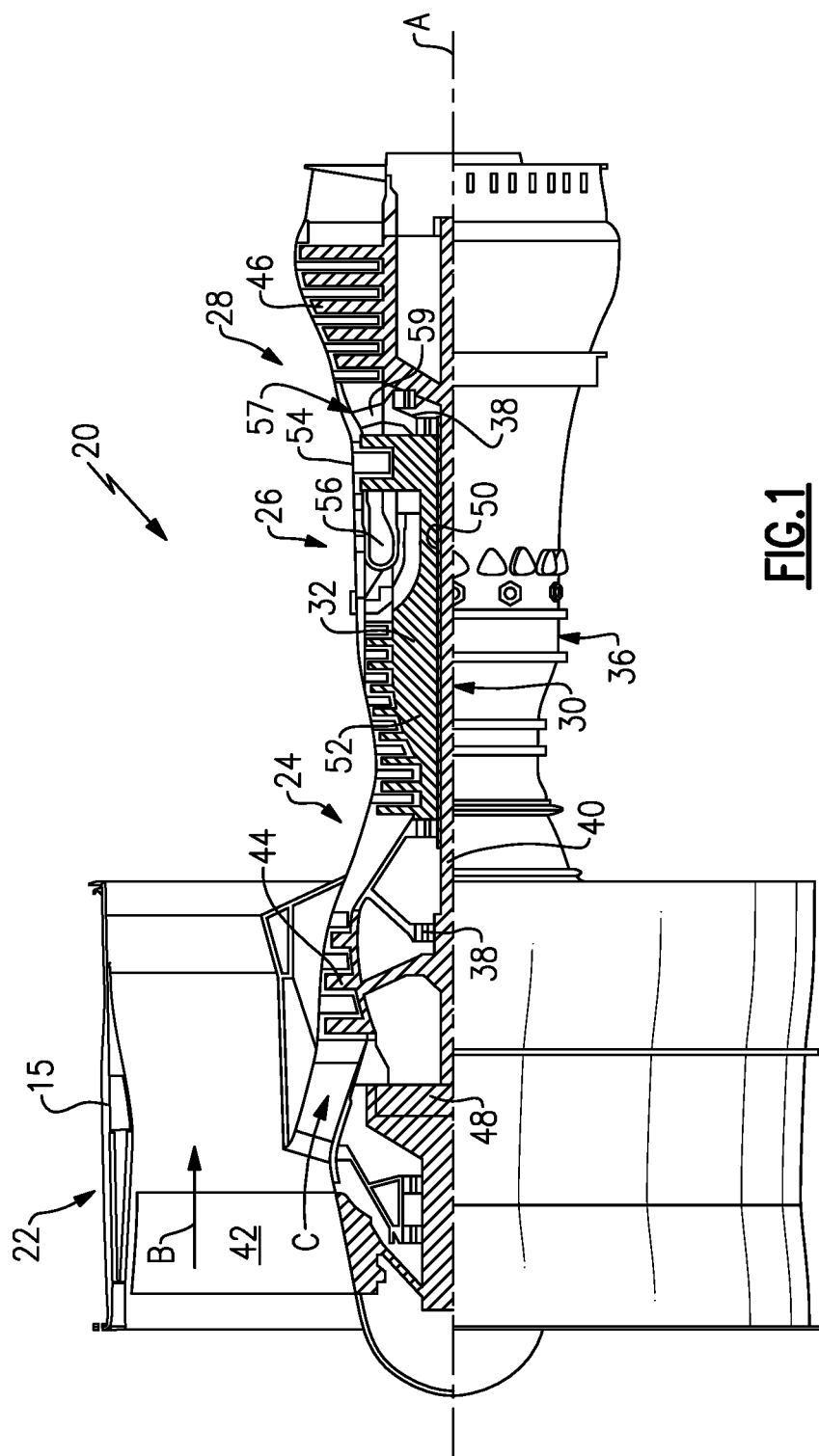
FIG. 1 is a schematic view of an example gas turbine engine according to a first non-limiting example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
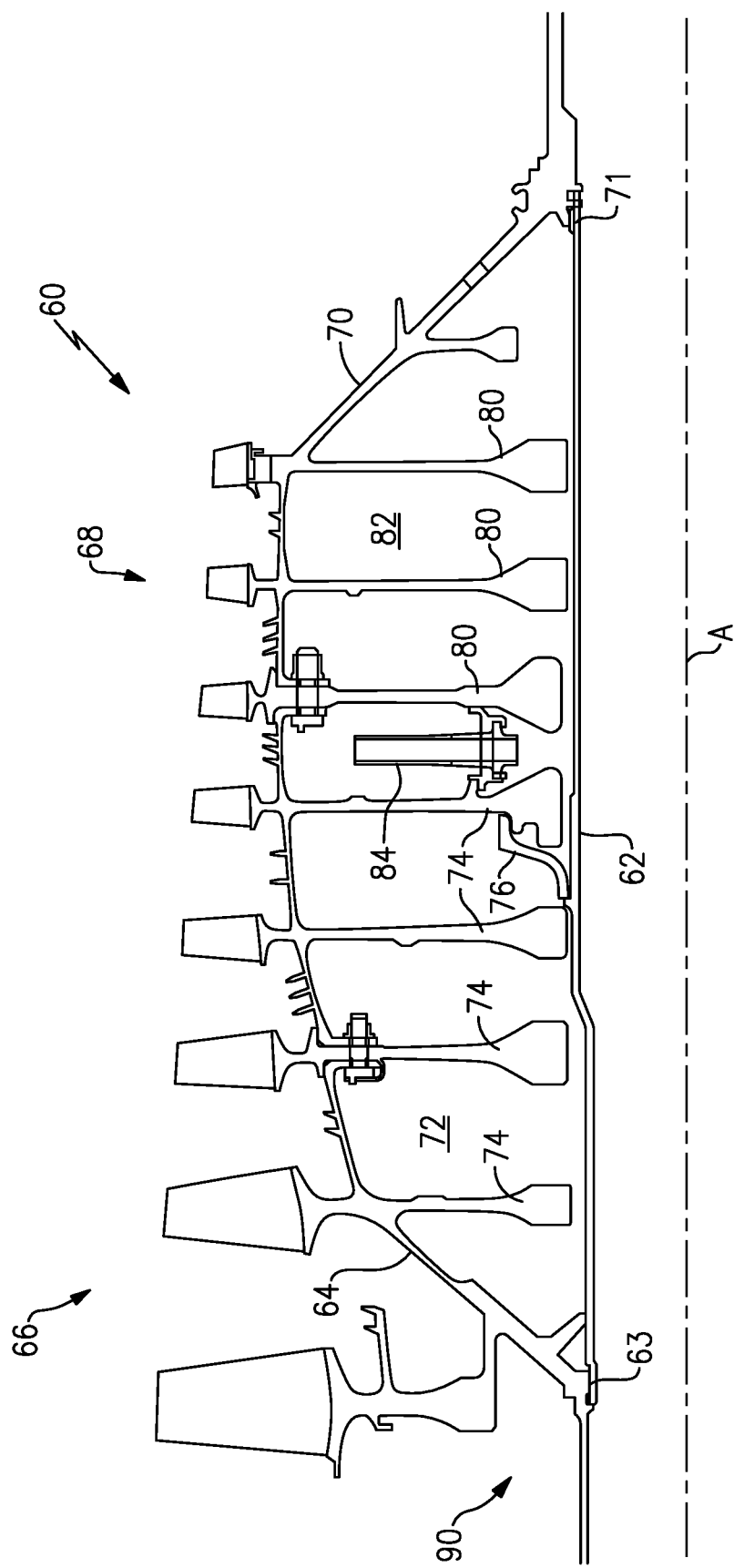
FIG. 2 is a schematic view of a rotor stack.

FIG. 2 schematically illustrates a high pressure compressor rotor stack 60 according to a non-limiting example of this disclosure. The rotor stack 60 is configured to rotate with the outer shaft 50 (FIG. 1) to compress the air traveling through the core flow path C. In the illustrated example, the rotor stack 60 includes a bore basket 62, a forward hub structure 64, a first plurality of rotor stages 66, a second plurality of rotor stages 68, and an aft hub structure 70. Although this disclosure illustrates the rotor stack 60 having the bore basket 62, this disclosure also applies to rotor stacks formed with a tie shaft in place of the bore basket 62.

As shown in FIG. 2, a forward rotor bore 72 is at least partially defined by the bore basket 62, the forward hub structure 64, and the first plurality of rotor stages 66. An axially forward end of the bore basket 62 is attached to the forward hub structure 64 with a threaded connection 63. The first plurality of rotor stages 66 includes corresponding rotor disks 74 that extend into the forward rotor bore 72. The bore basket 62 is secured to the aft hub structure 70 through a snap fitting 71 having at least one projection on the bore basket 62 that engages at least one tab on the aft hub structure 70. In this disclosure, axial or axially and radial or radially is with respect to the engine axis A unless stated otherwise.

The second plurality of rotor stages 68 includes corresponding rotor disks 80 that extend into the aft rotor bore 82. The aft rotor bore 82 is at least partially defined by the bore basket 62, the aft hub structure 70, and the second plurality of rotor stages 68. Cooling air may enter the aft rotor bore 82 through at least one anti-vortex tube 84, which de-swirls the flow of air in the aft rotor bore 82.

The forward rotor bore 72 and the aft rotor bore 82 are fluidly separated from each other through the use of a seal 76. In the illustrated example, the seal 76 extends between a radially inward and axially forward end contacting the bore basket 62 and a radially outer and axially aft end contacting an aft one of the rotor disks 74.

Figure 3:
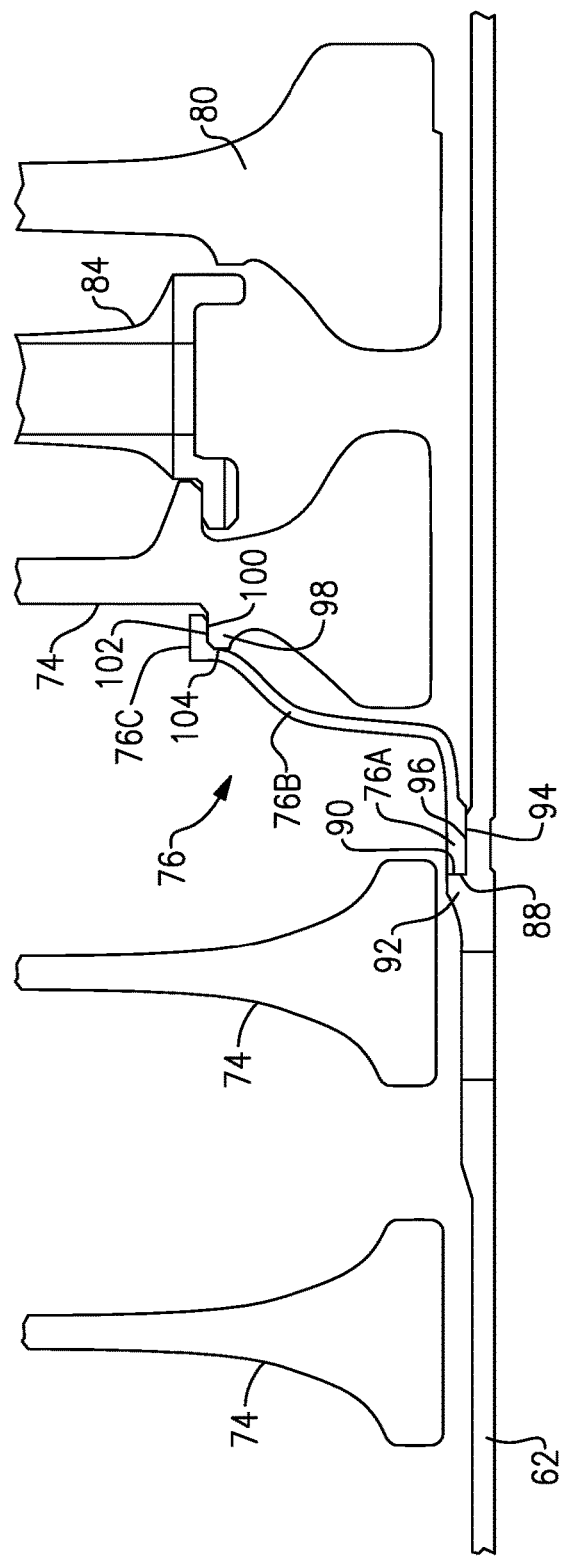
FIG. 3 is an enlarged view of a seal in the rotor stack of FIG. 2.
Figure 4:
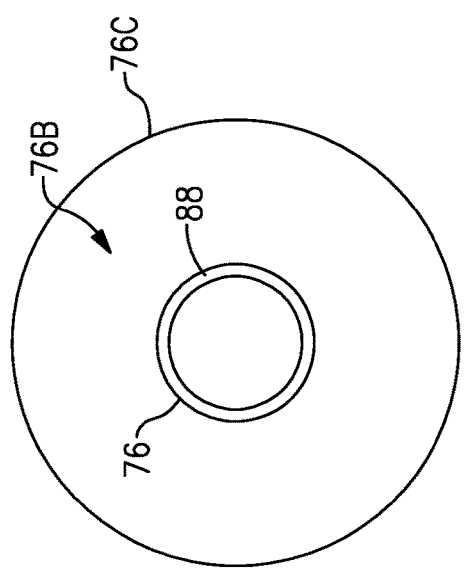
FIG. 4 is an end view of seal of FIG. 3.

FIG. 3 illustrates an enlarged view of the seal 76 engaging the bore basket 62 and the aft stage of the rotor disks 74. In the illustrated non-limiting example, the seal 76 includes a forward portion 76A, a transition portion 76B, and an aft portion 76C that form a continuous loop (FIG. 4). The forward portion 76A, or first portion, is generally cylindrical and extends axially around the engine axis A and includes a first thickness adjacent a forward end that is larger than a second thickness adjacent a downstream end of the forward portion 76A.

The forward portion 76A includes a forward end surface 88 facing axially upstream that engages a contact surface 90 facing aft on a tab 92. The tab 92 extends radially outward from the bore basket 62. The interface of the contact surface 90 on the tab 92 with the forward end surface 88 serves to locate the seal 76 in a desired axial position relative to the bore basket 62. The forward portion 76A extends from an axially overlapping relationship with a rotor disk 74 immediately upstream of the aft rotor disk 74 to a location immediately upstream of the aft rotor disk 74. Alternatively, the seal 76 could be located downstream of the aft stage of the rotor disks 74 in a reverse direction with the forward portion 76A located downstream of the transition portion 76B and the aft portion 76C located upstream of the transition portion 76B and engaging an aft surface of the aft stage of the rotor disks 74.

A radially inward facing surface on the forward portion 76A includes a shaft contact surface 94 that engages a seal contact surface 96 on a radially outward facing surface of the bore basket 62 to create a snap fit or press fit connection between the seal 76 and the bore basket 62. Only a portion of the forward portion 76A engages the bore basket 62. In the illustrated example, the shaft contact surface 94 extends less than 50% of the axial length of the forward portion 76A. As will be described later, the axial length of the forward portion 76A is sized to allow for radial movement relative to the bore basket 62 at a downstream end of the forward portion 76A while eliminating or reducing radial movement of the forward portion 76A adjacent the shaft contact surface 94 relative to the bore basket 62.

The transition portion 76B extends from the forward portion 76A to the aft portion 76C. In the illustrated example, the transition portion 76B begins where the seal 76 extends radially outward from the forward portion 76A and includes a portion extending axially such that at least a section of the transition portion 76B is conical in shape. Alternatively, the transition portion 76B could include a radial portion and an axial portion that is not conical. The transition portion 76B can also function as a diaphragm to allow both axial and radial movement between the forward portion 76A and the aft portion 76C. In the illustrated example, a thickness of the transition portion 76B is equal to or less than the first or second thicknesses of the forward portion 76A mentioned above.

The aft portion 76C, or second portion, of the seal 76 engages the aft rotor disk 74. The aft portion 76C engages the rotor disk 74 on a radially outer and thinner portion of the rotor disk 74 because the rotor disk 74 is less susceptible to radial movement during operation of the gas turbine engine 20 at this location. In the illustrated example, the aft portion 76C engages a tab 98 extending from the aft rotor disk 74. The tab 98 extends circumferentially around the engine axis A to form a seal with the aft portion 76C. The aft portion 76C includes a radially inward facing surface 100 that engages a radially outward face surface 102 on the tab 98. The tab 98 also includes an axially forward facing surface 104 that engages a portion of the seal 76. Alternatively, the tab 98 could be located on an axially downstream facing surface of the aft rotor disk 74 with the transition portion 76B extending under the aft rotor disk 74 to allow the aft portion 76C to extend axially forward to engage the tab on the axially downstream facing surface of the aft rotor disk 74.

During operation of the gas turbine engine 20, the forward rotor bore 72 of the rotor stack 60 is cooled with a different cooling source that is generally cooler than the cooling source used for the aft rotor bore 82 of the rotor stack 60. This is at least partially due to the increased temperatures experienced by the rotor stages 68 of the rotor stack 60 during operation. Traditionally, the forward rotor bore 72 and the aft rotor bore 82 were separated by a piston seal located between the bore basket 62 and the aft rotor disk 74. However, due to the relative movement between the aft rotor disk 74 and the bore basket 62, the rotor disk 74 and/or the bore basket 62 were prone to wear at contact points with the piston seal.

Use of the seal 76 eliminates or greatly reduces relative movement at the contact points between the seal 76 and the bore basket 62 and the seal 76 and the rotor disk 74 by allowing the seal 76 to accommodate for movement between the rotor disk 74 and the bore basket 62. In particular, the axial length of the forward portion 76A is selected of a sufficient length to allow a downstream end of the forward portion 76A to move radially or expand outward. This results in maintaining contact between the forward end surface 88 and the shaft contact surface 94 and a respective one of the contact surface 90 and the seal contact surface 96. Additionally, the radially inward facing surface 100 maintains contact with the radially outward face surface 102 on the tab 98. A thickness of the material for the forward portion 76A decreases in an axial downstream direction to allow for greater movement of the forward portion 76A.

The transition portion 76B accommodates for relative axial and radial movement between the aft rotor disk 74 and the bore basket 62 by functioning like a diaphragm to allow for axial and radial flexure. Furthermore, the transition portion 76B could include a reduced material thickness relative to the forward portion 76A to allow for a greater amount of radial and axial movement in the transition portion 76B as compared to the forward portion 76A.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A seal for a rotor stack comprising:
    a first portion including a shaft contact surface, wherein the shaft contact surface faces radially inward and the first portion includes a first thickness at the shaft contact surface and a second thickness axially spaced from the shaft contact surface and the first thickness is greater than the second thickness;
    a second portion including a rotor disk contact surface;
    a transition portion connecting the first portion and the second portion and the transition portion extending radially outward from the first portion at a first end of the transition portion to the second portion at a second end of the transition portion and the transition portion defines a diaphragm; and
    wherein the shaft contact surface faces radially inward and an axially forward most end of the first portion includes a tab contact surface and an axial length of the shaft contact surface is greater than the first thickness.

2. The seal of claim 1, wherein the transition portion extends radially outward and axially away from the first portion.

3. The seal of claim 2, wherein a thickness of the entire transition portion is less than a thickness of the first portion.

4. The seal of claim 2, wherein at least a portion of the transition portion is conical and defines the diaphragm.

5. The seal of claim 1, wherein the rotor disk contact surface faces radially inward and in an axial direction.

6. The seal of claim 1, wherein at least a section of the transition portion is conical.

7. A gas turbine engine comprising
a plurality of rotor disks and a second plurality of rotor disks aft of the first plurality of rotor disks, wherein the first plurality of rotor disks includes an aft rotor disk;
a shaft located radially inward from the first plurality of rotor disks and the second plurality of rotor disks;
a seal extending from the shaft to the aft rotor disk, wherein the seal contacts the shaft axially spaced from the aft rotor disk, wherein the seal includes:
a first portion having a shaft contact surface, wherein the shaft contact surface faces radially inward and the first portion includes a first thickness at the shaft contact surface and a second thickness axially spaced from the shaft contact surface and the first thickness is greater than the second thickness;
a second portion having a rotor disk contact surface; and
a transition portion connecting the first portion and the second portion and the transition portion extends radially outward from the first portion and the transition portion defines a diaphragm; and
wherein the shaft contact surface faces radially inward and an axially forward most end of the shaft contact portion includes a tab contact surface for engaging a tab on the shaft and an axial length of the shaft contact surface is greater than the first thickness.

8. The gas turbine engine of claim 7, wherein the transition portion extends radially outward and axially from the first portion.

9. The gas turbine engine of claim 8, wherein a thickness of the entire transition portion is less than the first thickness of the first portion.

10. The gas turbine engine of claim 8, wherein at least a portion of the transition portion is conical and defines the diaphragm and at least a portion of the first portion is cylindrical.

11. The gas turbine engine of claim 8, wherein the rotor disk contact surface facing radially inward and engages a radially outer surface of a tab on an axially forward side of the aft rotor disk.

12. The gas turbine engine of claim 7, wherein the second portion engages an axially forward side of the aft rotor disk.

13. The gas turbine engine of claim 6, wherein at least a section of the transition portion is conical.

14. A method of sealing a shaft relative to a rotor disk comprising the steps of:
locating a first plurality of rotor disks axially forward of a second plurality of rotor disks;
locating a shaft radially inward from the first plurality of rotor disks and the second plurality of rotor disks;
engaging the shaft axially spaced of an aft rotor disks of the first plurality of rotor disks with a first portion of a seal;
engaging an axial face of the aft rotor with a second portion of the seal, wherein the seal includes:
a first portion having a shaft contact surface, wherein the shaft contact surface faces radially inward and the first portion includes a first thickness at the shaft contact surface and a second thickness axially spaced from the shaft contact surface and the first thickness is greater than the second thickness;
a second portion having a rotor disk contact surface; and
a transition portion connecting the first portion and the second portion and the transition portion extends radially outward from the first portion and the transition portion defines a diaphragm;
fixing a first end of the first portion relative to the shaft and moving a second end of the first portion relative to the shaft in response to relative movement between the shaft and the aft rotor disk
moving the transition portion in at least one of an axial or radial direction in response to relative movement between the shaft and the aft rotor disk, wherein a thickness of the entire transition portion is less than the first thickness and an axial length of the shaft contact surface is greater than the first thickness.

* * * * *